United States Patent [19]

Dean

[11] Patent Number: 4,964,289
[45] Date of Patent: Oct. 23, 1990

[54] PROCESS AND DEVICE FOR REGULATING THE FLATNESS OF A COLD ROLLED METAL STRIP

[75] Inventor: Robert J. Dean, Uhwiesen, Switzerland

[73] Assignee: Swiss Aluminum Ltd., Chippis, Switzerland

[21] Appl. No.: 451,807

[22] Filed: Dec. 18, 1989

[30] Foreign Application Priority Data

Dec. 30, 1988 [CH] Switzerland ............ 4857/88

[51] Int. Cl.$^5$ ............................................. B21B 37/10
[52] U.S. Cl. ............................................. 72/13; 72/10;
374/121; 374/137
[58] Field of Search ............ 72/9, 10, 13, 17, 200;
374/121, 124, 137, 141, 153

[56] References Cited

U.S. PATENT DOCUMENTS

| | | |
|---|---|---|
| 3,559,726 | 2/1971 | Menasoff . |
| 3,990,284 | 11/1976 | Barten . |
| 4,157,039 | 6/1979 | Kilmister et al. ............ 374/137 |
| 4,193,302 | 3/1980 | Nixon . |
| 4,289,005 | 9/1981 | Cabaret et al. ............ 72/12 |
| 4,316,088 | 2/1982 | Corbier et al. ............ 374/153 |

FOREIGN PATENT DOCUMENTS

| | | |
|---|---|---|
| 2747729 | 4/1979 | Fed. Rep. of Germany . |
| 3735022 | 12/1988 | Fed. Rep. of Germany . |
| 1465792 | 3/1977 | United Kingdom . |

OTHER PUBLICATIONS

Stahl and Eisen, vol. 100, No. 9, May 5, 1980.

*Primary Examiner*—Lowell A. Larson
*Assistant Examiner*—T. C. Schoeffler
*Attorney, Agent, or Firm*—Bachman & LaPointe

[57] ABSTRACT

In a cold rolling mill an infra-red detector is situated a distance from the metal strip and, with respect to the direction of strip throughput, behind the roll gap formed between two work rolls. The detector determines local temperature differences linearly over the whole width of the strip and converts the infra-red radiation into electric signals to actuate means for regulating the roll gap.

The metal strip in particular a thin strip on foil, emerging from the roll gap is deflected by at least one contact roll that serves as a tension roll and has low back-reflection capacity and high capacity for emission of infra-red radiation, then deflected by deflection roll/rolls without slipping, and the infra-red radiation from the contact roll/rolls registered along a mantle line and converted into control signals to actuate means for regulating the roll gap.

At least the outer mantle of the contact roll/rolls is comprised of a material that can be ground, reflects little and has an infra-red emission capacity of at least 0.7 with reference to the infra-red emission capacity of a black body.

17 Claims, 2 Drawing Sheets

PROCESS AND DEVICE FOR REGULATING THE FLATNESS OF A COLD ROLLED METAL STRIP

BACKGROUND OF THE INVENTION

The invention relates to a process for registering temperature differences for the purpose of regulating the flatness of a cold rolled metal strip, in particular a thin strip or a foil, in a cold rolling mill by means of an infra-red detector. The infra-red detector is situated a distance from the metal strip and, with respect to the direction of throughput of the strip, after the roll gap formed between two work rolls. The detector has the purpose of determining local temperature differences linearly over the whole width of the strip and converting the infra-red radiation into electric control signals to actuate means for regulating the roll gap. Further, the invention relates to a cold rolling mill with infra-red detector for carrying out the process.

Insufficient flatness of cold rolled metal strip results in kinking and bulging either immediately after rolling or later when the strip is processed further.

A sufficient degree of flatness is therfore one of the most important requirements of cold rolled metal strip, and is given particular attention during quality control. Insufficient flatness can have its origin in the strip entering the roll gap if the entering strip is not completely flat, and/or as a result of incorrect cold rolling. In industry different alloys or the same alloy with different hardness are often rolled to different widths; this, among other things concerning the flatness of the cold rolled strip, can repeatedly lead to problems.

Insufficient flatness of a cold rolled metal strip can be due to further process-related factors:

Too low a pressure setting, the result of which is the formation of "longitudinal waves".

Undersired bending of one or both work rolls, causing the metal strip to be concave or convex in cross-section.

Adjusting devices located at the inlet-side with inacurately set distance, resulting in strip that is wedge-shaped in cross-section.

Wrongly controlled spray jets for applying cooling medium-leading to metal strip of irregular cross-section.

Working roll/rolls of insufficient surface quality, resulting in irregularities running in the longitudinal and transverse direction in the strip.

The last mentioned problem can be solved only by changing the work roll/rolls and will not be considered herein.

The other factors leading to insufficient flatness can be eliminated by applying means that were previously actuated manually, today fully automatically. These means, for the examples given above, are: increasing the load applied by the work rolls, altering the bending moment, shifting one or both inlet-side devices for adjusting the work rolls, and altering the amount of cooling medium supplied by one or more nozzles. A further means is to employ backing rolls of variable geometry, capable, for example, of adopting different cambers via hydraulic pressure. Of course it is also possible to apply a plurality of means at the same time via an automatic control facility.

The deformation or plastic deformation of the metal during cold rolling produces an increase in temperature which is proportional to the reduction made during the cold rolling pass. The increase in temperature of the cold rolled metal strip is therefore also a measure of the deformation. A non-uniformly deformed i.e. non-planar metal strip is therefore not equally warm at all places. Local temperature differences can be measured, the temperature differences in fact being more important than the actual temperature.

Measured temperature differences in the strip can be converted to electric impulses or signals to actuate the above mentioned means of regulating the roll gap and with that the flatness of the cold rolled strip.

The cold rolled strips emerging from the rolling mill radiate, like all bodies, electromagnetic waves the intensity of which is a function of the surface temperature. This phenonenom is called thermal radiation, the wave-length of which lies in the infra-red range. Also rising with temperature is the emitted thermal radiation which is specific to the object.

Described in the British patent document GB-PS No. 1 465 792 is a process for regulating the flatness of strip material during cold rolling in a rolling mill, wherein the temperature measurement encompasses the whole width of the moving strip.

The temperature is measured on the strip immediately after the roll gap. An infra-red camera for measuring the thermal radiation converts the measured temperature differences into electric signals to set the roll gap at a constant value, this by employing the inlet-side setting devices and/or the spray nozzles for the coolant as the control means.

This process exhibits the considerable disadvantage that the emissivity of the metal strip emerging from the roll gap is very small in the infra-red range. With reference to the ideal emissivity of a black body the infra-red emissivity of metal strips are only in the range of about 0.05–0.25, depending on the roughness of the surface.

Because this infra-red emissivity is so low, the measurement and control instruments are correspondingly sensitive and suffer relatively large scatter.

SUMMARY OF THE INVENTION

The object of the present invention is to develop a process and device for determining temperature differences for the purpose of regulating the flatness of a cold rolled metal strip of the kind referred to above, which function with higher accuracy yet are simple to employ and require only slightly additional investment. The foregoing object is achieved by way of the present invention in that the metal strip emerging from the roll gap is deflected by at least one contact roll that serves as a tension roll and has low back-reflection capacity and high capacity for emission of infra-red radiation, then deflected by deflection roll/rolls without slipping, and the infra-red radiation from the contact roll/rolls registered along a mantle line and converted into control signals to actuate control means.

The temperature profile of the cold rolled metal strip is continuously transferred to the surface of the contact roll and can be measured there with the infra-red detector. This represents, compared with the measurement of the infra-red radiation of a metal strip which has a high reflection capacity and low capacity for infra-red emission, a significant improvement in accuracy, and this using simple means.

BRIEF DESCRIPTION OF THE DRAWINGS

The invention is described in greater detail hereinafter with the aid of exemplified embodiments shown schematically in the drawings.

DETAILED DESCRIPTION

Figure 1:
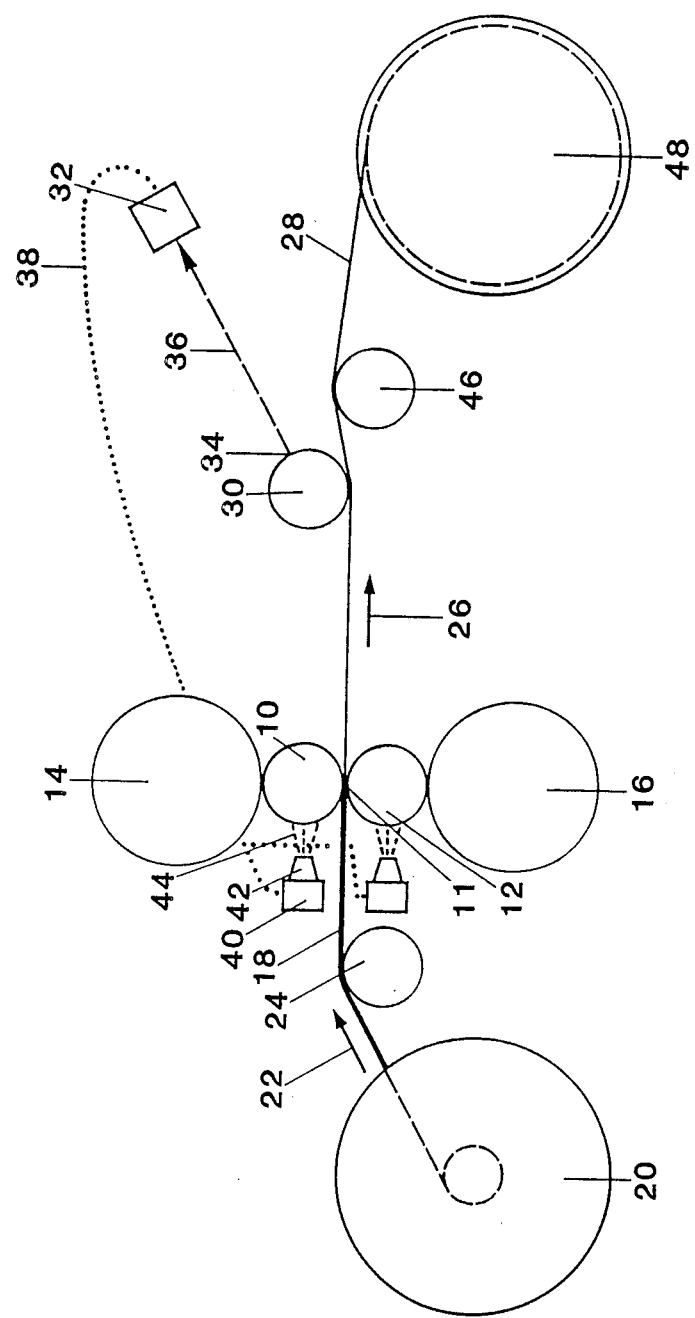
FIG. 1 is a partly diagrammatic sketch showing the principle features of a cold rolling mill with a contact roll.

Before regulating in the manner according to the invention, the temperature profile of the metal strip in the transverse direction fluctuated by some degrees centigrade, afterwards by only about 1° C., which allows one to conclude an extremely high degree of flatness in the cold rolled metal strip. As only temperature differences play a role in the generation of electric signals for actuating means to control the roll gap, the temperature profile is for the greater part maintained also if there is some cooling of the metal strip between the roll gap and the contact roll.

Two factors are of fundamental importance with regard to the identity of the temperature profile on the metal strip and on the contact roll; these are:

The strip must be led over the contact roll with sufficient contact pressure in order that exact heat-transfer can take place without changing local temperature differences, and the metal strip must not slide on the contact roll, which would result in heat of friction being generated and so erroneous temperature measurement.

In order to generate sufficient contact pressure the cold rolled metal strip is deflected by the contact roll, preferably by an angle $\beta$ of at least 5°, in particular about 15°. The greater the strip tension, the smaller the angle $\beta$ can be.

Trials in which static temperature measurements were made immediately after stopping the rolling mill showed that the difference in temperature between that of the metal strip and that of the surface of the contact roll was only $+/-2°$ C. The temperature profile over the width of the strip and that of the mantle line on the contact roll were, however, substantially the same.

Furthermore, it could be shown that not only with aluminum alloys but also steel and other hard materials larger reductions per pass and/or large throughput rates not only produce much higher temperatures in the cold rolled metal strip, but also larger temperature differences in the transverse direction i.e. across the strip. The process according to the invention can also be applied successfully to these variants.

The intensity of the infra-red radiation from the contact roll which is registered by the detector does not change exactly in proportion to the temperature. Furthermore, the sensitivity of the infra-red detector changes with the room temperature. For that reason the temperature of the contact roll can not be measured with optimal accuracy and converted to electric control signals using a normal infra-red detector. Usefully therefore the infra-red radiation emitted along the mantle line of the contact roll is compared with that of a standard reference temperature source and linearly corrected.

The detector for measuring the infra-red radiation preferably contains, built in to the camera unit, a black body radiating reference source and a linearizing circuit to perform the above-mentioned correction.

The infra-red radiation emitted from the contact roll is transmitted through the atmosphere to the detector, in the course of which the intensity of radiation is reduced as a result of absorption and scatter due to gases and dust particles in the atmosphere. These losses are dependent on the wave length. The detector registers by way of preference only the infra-red radiation in the wavelength range 3.6–4 $\mu$m and/or 8–13 $\mu$m, whereas the other wavelengths are filtered out. The loss of radiation in this preferred range is negligibly small.

The control means for altering the roll gap via electric signals referred to hereinabove is preferably a variation in the supply of cooling medium, in particular rolling lubricant, to the spray nozzles arranged at the work rolls in their longitudinal direction. By changing the amount of coolant supplied to a nozzle it is possible to alter the cooling of work roll in different segments. As a result, in particular with thin cold rolled metal strip, it appears that tribological effects rather than the thermal expansion causes a change in the roll gap in the segment in question.

With reference to the device, the cold rolling mill with an infra-red detector for carrying out the process, the object of the present invention is achieved in that at least the outer mantle of the contact roll/rolls deflecting the cold rolled metal strip is/are of a material that can be ground, is of low reflectivity and has an infra-red emission capacity of at least 0.7 with reference to the infra-red emissivity of a black body.

The contact roll which is also a tension roll for depressing the cold rolled metal strip must, apart from the low reflectivity and high infra-red emissivity, also exhibit adequate mechanical strength but must not damage the metal strip.

The material of the contact roll taking on the temperature profile of the metal strip is preferably a plastic of phenolic resin or polyurethane. Materials that have been found to be particularly suitable are phenolic resin-cotton hard woven layers that can be finely ground to a tolerance of about 0.2 mm.

In order that the temperature profile generated in the cold rolled strip in the roll gap can be transferred with high accuracy onto the contact roll, the contact roll must be located as close as possible to the roll gap. At the same time, however, other parameters have to be taken into account, in particular the structural requirements of a rolling mill. In practice in industry the distance of the contact roll from the roll gap is usually about 2–4 m; usefully there are no tension rolls or deflection rolls between the contact roll and the roll gap.

In the case of a particular version of the cold rolling mill according to the invention, the roll effecting the deflection of the strip after the contact roll i.e. downstream in the direction of strip movement, can be replaced by a flatness measurement roll. With such flatness roll the radial tension is measured in various individual segments during the rolling operation and the tension values converted into control signals. This generally known method can replace the measurement of infra-red radiation i.e. be an alternative possibility and-/or supplement it.

Although no contact roll is employed as a rule, it is also possible for a plurality of contact rolls with corresponding deflection rolls to be arranged one behind the other and their temperature profile measured on a mantle line. Contact rolls that are further downstream than the first contact roll are of less importance.

The quarto mill shown in FIG. 1 comprises, as is conventional, two work rolls 10,12 each with a back-up roll 14,16. The work rolls 10,12 form the roll gap 11 which can be adjusted with adjusting devices not shown here. The rolls, likewise in a conventional manner and not shown here, are releasably mounted in a housing or frame. The work rolls 10,12 in particular are finely ground with greatest precision.

A hot rolled or intermediate annealed metal strip 18, in particular such out of an aluminum alloy or steel, is uncoiled from the spool 20 in the direction indicated by the arrow 22 and led over a deflection roll 24 into the roll gap 11 formed by the two work rolls 10,12. There, the relatively soft metal strip 18 is cold rolled to a degree according to the set width of the roll gap 11 and passed on further at a speed of about 25 m/sec in the direction indicated by the arrow 26. The thickness of the hot rolled or intermediate annealed metal strips 18 that are cold rolled in the mill is preferably in the range 0.5–2 mm. These strips are cold rolled in one or more passes, if desired with intermediate annealing, to a strip 28 having a final thickness that is preferably in the range 0.01–0.5 mm. The thickness of the strips 18,28 and the reduction per pass depend on the application, on the material and on the hardness of the strip 18 fed into the cold rolling mill.

The contact roll 30 which is in the form of a tension roll in a conventional cold rolling mill, at least in the region of the surface, comprises a phenolic resin-cotton hard woven layer, a material of low reflectivity and high capacity for infra-red emission, i.e. having a value of about 0.9 compared with a black body. The contact roll 30 also fulfils its role as a tension roll. An infra-red detector 32 is focused on the mantle line of contact roll 30 and registers the infra-red radiation, indicated by a broken line, along a mantle line 34. This mantle line 34 is imaginary; it remains at the same position as the contact roll 30 turns.

The electric control signals generated in the infra-red detector 32 are conducted along a wire or cable 38, indicated by a dotted line, to the cooling device 40 for work rolls 10,12, said device 40 being situated on the strip entry side of the rolls. There the electric signals regulate the amount of coolant 44 to be supplied to the spray nozzles 42. Each nozzle 42 sprays a sector of the surface of the work rolls 10,12 and can be individually supplied with coolant 44 in a controlled manner.

After the temperature profile of the cold rolled strip 28 has been transferred to the contact roll 30, the strip 28 is passed over a deflection roll 46 then coiled onto spool 48.

Figure 2:
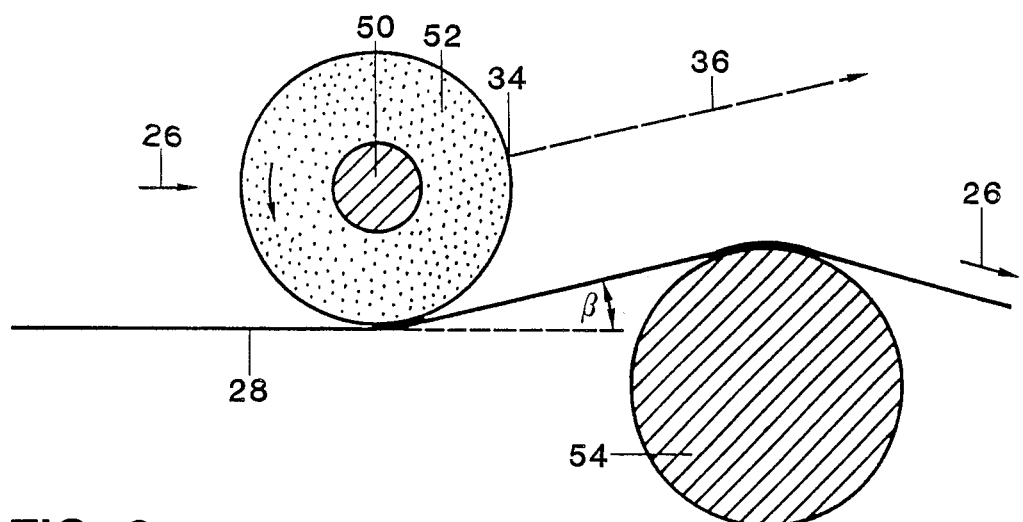
FIG. 2 is a vertical cross-section through the region containing the contact roll in the cold rolling mill.

FIG. 2 shows the deflection of the cold rolled strip 28 at the contact roll 30 represented by an angle β amounting to about 15°. This causes the metal strip 28 to be pressed against the surface of the contact roll 30 sufficiently for the temperature profile developed in the roll gap to be transferred to the surface of the contact roll 30, and for the contact roll 30 to be turned without slippage occuring. The local differences in metal strip temperature that are transferred to the contact roll 30 give rise to differences in infra-red radiation 36. This is detected along the mantle line of the rotating contact roll 30 and converted into control signals.

The contact roll 30, which can have an outer diameter of 20–25 cm is made up of a steel core 50 and a smoothly ground mantle layer 52 in the form of a phenolic resin-cotton hard woven layer.

The deflection roll for deflecting the strip 28 by an angle β is in the form of a flatness roll 54. This can function as an alternative to or supplimentary to the contact roll 30 according to the invention.

Figure 3:
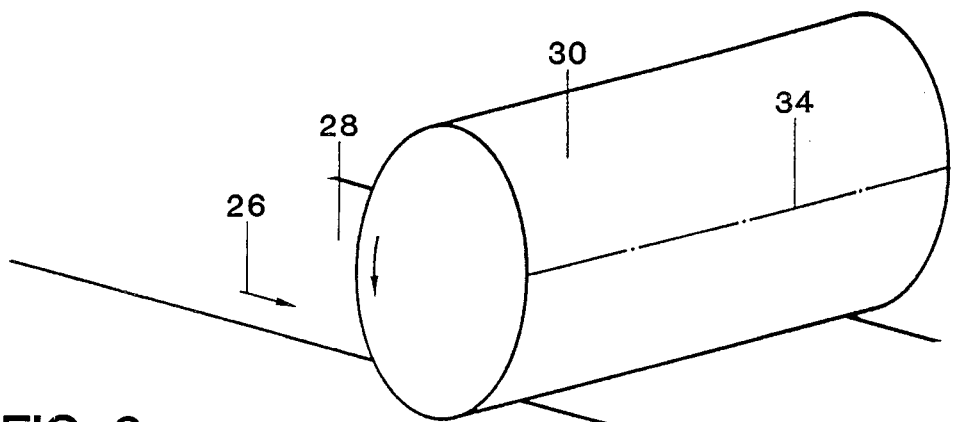
FIG. 3 is a perspective view of the contact roll.

The part of the outer mantle of the contact roll 30 visible in FIG. 3 bears the temperature profile of the cold rolled metal strip 28 deflected over it. The infra-red detector 32 (FIG. 1) is focused on the mantle line 34 and registers linearly the infra-red radiation 36 (FIG. 1,2) emitted by the contact roll 30 in the region of this mantle line 34.

The metal strip 28 shown in FIG. 3 was cold rolled with a 50% reduction in one pass from 0.30 to 0.15 mm.

Figure 4:
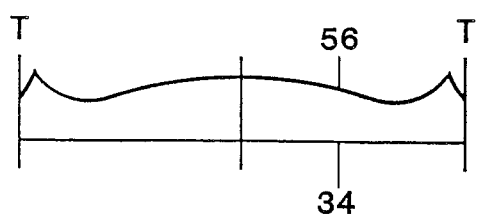
FIG. 4 is a temperature profile referring to a moment in time.

FIG. 4 shows a temperature profile 56 along a mantle line 34 at a specific moment in time. For clarification purposes the temperature profile 56 is greatly magnified here. With the process according to the invention it is possible to reduce the deviations in temperature over a profile width of, for example, 1600 mm to less than 1° C. In the case of a metal strip that is cold rolled without regulation the temperature fluctuations are about 5–10° C.

The temperature rises by about 10° C. or more from the start to the end of cold rolling a coil. This increase in temperature is not affected by the process according to the invention. At all temperatures the temperature profile in the transverse direction remains practically unchanged.

The infra-red radiation along the mantle line 34 is registered, for example, at a frequency of 120 Hz.

What is claimed is:

1. Process for registering temperature differences of cold rolled metal strip for the purposes of regulating the flatness of the strip, which comprises:
    providing a cold rolling mill having a roll gap formed between two work rolls thereof;
    feeding a metal strip through the roll gap to cold roll the strip;
    providing at least one contact roll as a tension roll downstream of the roll gap, said contact roll having low back-reflection capacity and high capacity for emission of infra-red radiation;
    deflecting the metal strip after it emerges from the roll gap by said contact roll, without slipping;
    providing an infra-red detector situated at a distance from the metal strip downstream of the roll gap;
    determining local temperature differences linearly over the whole width of the metal strip after it emerges from the roll gap by measuring the infra-red radiation along a mantel line on said contact roll by said detector; and
    converting said measured infra-red radiation into control signals to actuate control means for said cold rolling mill.

2. Process according to claim 1 wherein said strip is thin strip or foil.

3. Process according to claim 1 wherein said control means regulates the roll gap.

4. Process according to claim 1 wherein the metal strip is deflected by a combination of said contact roll and at least one deflection roll downstream thereof.

5. Process according to claim 1 wherein the cold rolled strip is deflected by the contact roll by an angle of at least 5°.

6. Process according to claim 5 wherein the cold rolled strip is deflected by the contact roll by about 15°.

7. Process according to claim 1 wherein the infra-red radiation from the contact roll is continuously compared in the infra-red detector with a reference infra-red radiation from a black body and linearly corrected to compensate for the non-proportional temperature dependence and fluctuations in the room temperature.

8. Process according to claim 1 in which only the infra-red radiation of wave lengths selected from the group consisting of 3.6–4 μm, 8–13 μm and mixtures thereof are registered by the infra-red detector and the other wavelengths are filtered out.

9. Process according to claim 1 wherein said control means fees cooling medium to the cold rolling mill.

10. Process according to claim 9 wherein the cooling medium is supplied to spray nozzles arranged in the longitudinal direction of the work rolls, and wherein the amount of said cooling medium is regulated.

11. Device for registering temperature differences of cold rolled metal strip for the purposes of regulating the flatness of the strip which comprises:
    a cold rolling mill having a roll gap formed between two work rolls thereof;
    at least one contact roll as a tension roll downstream of the roll gap for deflecting the metal strip after it emerges from the roll gap, said contact roll having low reflectivity, being of a material that can be ground, and having an infra-red emission capacity of at least 0.7 with reference to the infra-red emissivity of a black body;
    an infra-red detector downstream of the roll gap for measuring the infra-red radiation along a mantle line on said contact roll; and
    means for converting the measured infra-red radiation into control signals to actuate control means for said cold rolling mill.

12. Device according to claim 11 wherein the material of the contact roll is selected from the group consisting of plastic, a phenolic-resin-cotton hard woven layer, and polyurethane.

13. Device according to claim 11 wherein the contact roll comprises a steel core and a mantle layer of low reflectivity material that strongly emits infra-red radiation.

14. Device according to claim 13 wherein said mantle layer has an outer diameter of 20–25 cm.

15. Device according to claim 11 wherein the contact roll is positioned as close as possible to the roll gap without an intermediate roll between the contact roll and the roll gap.

16. Device according to claim 11 including a strip deflection roll downstream of the contact roll.

17. Device according to claim 11 including a flatness measurement roll downstream of the contact roll.

* * * * *